July 8, 1941. W. R. BALLOU, JR 2,248,654
EQUIPMENT FOR AIR CONDITIONING VEHICLES
Filed Nov. 23, 1938
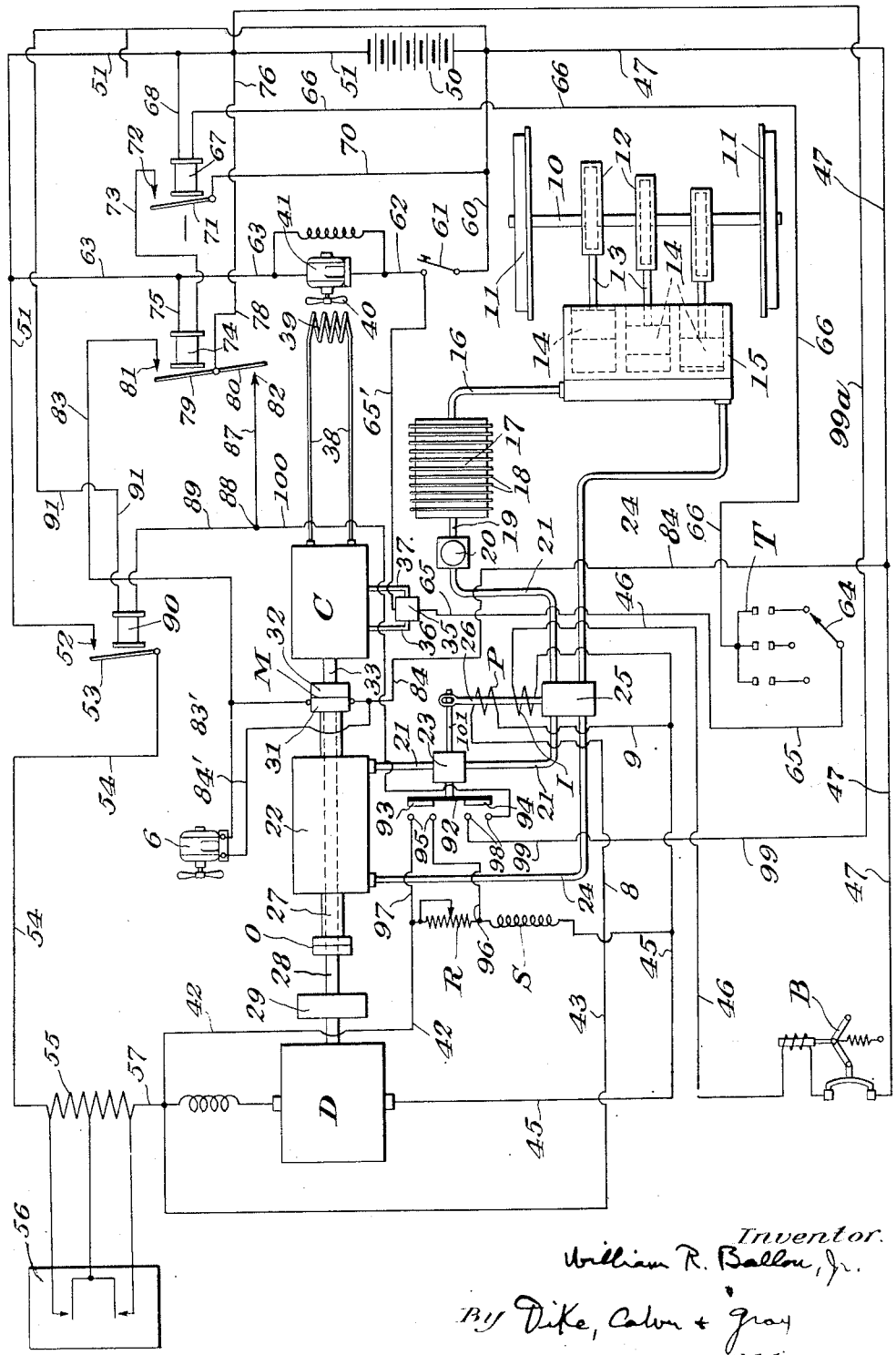
Inventor.
William R. Ballou, Jr.
By Dike, Calver & Gray
Attorneys Patented July 8, 1941

2,248,654

UNITED STATES PATENT OFFICE 2,248,654

EQUIPMENT FOR AIR CONDITIONING VEHICLES

William R. Ballou, Jr., Boston, Mass., assignor of one-half to William F. Wright, Lisbon, Ohio Application November 23, 1938, Serial No. 242,008

10 Claims. (Cl. 290—7)

The equipment required for air conditioning railroad cars or other closed vehicles is very expensive. The conventional equipment includes a motor for driving a refrigerant compressor and a separate generator for charging a battery. Expensive accessory equipment also must be provided such as starter equipment for the motor and a voltage regulator for the generator as well as special relay assemblies for controlling the connection between the generator and the battery and equipment for controlling the polarity of the generator.

The present invention contemplates an installation whereby much of the expensive equipment previously required can be eliminated. Specifically, as applied to air conditioning equipment the invention contemplates a refrigerant compressor which may be driven either by a dynamo, acting as a motor, or by a device, such as an hydraulic motor deriving its power in response to the motion of the vehicle. When the vehicle is traveling above a predetermined speed, the dynamo may act as a generator to charge a battery.

The invention will be more clearly understood from the following description in conjunction with the accompanying drawing in which the single finger is a diagrammatic lay-out of an illustrative embodiment of the invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The construction illustrated in the accompanying drawing is an arrangement for supplying a cooling medium for use in air conditioning of railroad cars. In the drawing, the railroad car is illustrated by a single axle 10 upon each end of which is secured a wheel 11. Fixed upon the axle 10 are a plurality of eccentrics 12 each adapted to actuate an eccentric rod 13. Each of the rods 13 is connected to the piston 14 of an hydraulic pump 15. The liquid, such as a light oil, is supplied from the pump 15 through a conduit 16 to an oil reservoir 17 which may be supplied with cooling fins 18. The oil is supplied under pressure from the reservoir 17 through a conduit 19 to an air drum 20 and from the air drum 20 through a conduit 21 to an hydraulic motor 22. A velocity switch 23 is interposed in the conduit 21. The fluid from the hydraulic motor 22 is returned through a conduit 24 to the hydraulic pump 15. A by-pass valve construction 25 connects the conduits 21 and 24 at a suitable location between the pump 15 and motor 22, the flow of liquid through the by-pass 25 being controlled by a valve having a stem 26.

The hydraulic motor 22 generates power to rotate a sleeve 27, the outer end of which carries one element of an overrunning clutch O. The other element of the overrunning clutch is secured upon a shaft 28 which is connected through gearing 29 with the armature shaft of a dynamo D. The shaft 28 extends through the sleeve 27 and through the hydraulic motor 22 and is provided at its end with one element 31 of a magnetic clutch M. The other element 32 of the magnetic clutch is carried by the rotatable shaft 33 of a refrigerant compressor C. A pressure switch 35 is connected by a conduit 36 with the low pressure side of the compressor C and by a conduit 37 with the high pressure side of the compressor C. Conduits 38 connect the compressor with a cooling coil 39 which is positioned in the path of air created by a fan 40 driven by a motor 41.

The dynamo D is provided with the usual field resistor R and shunt field S which are connected in series by the leads 42 and 45. A potential coil P is imposed across the terminals of the dynamo D through leads 3 and 9. One terminal of the dynamo is connected by a lead 45 to the current coil I and the latter is connected by a lead 46 in series with a circuit breaker B which is connected by a lead 47 with one terminal of a battery 50. The other terminal of the battery is connected by a lead 51 to a contact 52 which is adapted to be connected through a switch arm 53 and a lead 54 to a motor starter resistor 55 forming part of a conventional starting panel 56. The motor-starting resistor 55 is connected through a lead 57 to the other terminal of the dynamo D.

A lead 60 connects the lead 47 with a manually operable switch 61 which is arranged to connect the lead 60 with a lead 62 connected to one terminal of the motor 41. The other terminal of the motor 41 is connected by a lead 63 with the lead 51. A thermostat T is provided with a temperature selector arm 64 which is connected by a lead 65 with one terminal of the pressure switch 35. The other terminal of the pressure switch is connected by a lead 65' to the lead 62. The other terminal of the thermostat T is connected by a lead 66 to one terminal of a relay 67, the other terminal of which is connected by a lead 68 to the lead 51. The lead 66 is connected by a lead 70 to a switch arm 71 which is adapted to be actuated by the relay 67 to engage a contact 72. The contact 72 is connected by a lead 73 with one terminal of a relay 74, the other terminal of which is connected by a lead 75 to the lead 63. A lead 76 connects the lead 51 to dual switch arms 79 and 80. The switch arms 79 and 80 are adapted to be actuated by the relay 74 to engage contacts 81 and 82 respectively. The contact 81 is connected by a lead 83 to one terminal of the magnetic clutch M. The other terminal of the magnetic clutch M is connected by a lead 84 to the lead 47. A lead 83' connects the lead 83 with one terminal of a motor 6 which drives a fan for cooling the condenser forming part of the refrigerant compressor unit. The other terminal of the motor 6 is connected by a lead 84' to the lead 84. The contact 82 is connected by a lead 87 to a terminal 88 which is connected through a lead 89 to one terminal of a relay 90, the other terminal of which is connected through a lead 91 to the lead 47a. The relay 90 is adapted to actuate the switch arm 53 to bring it into engagement with the contact 52 thereby connecting the lead 51 from the battery with the lead 54 which connects with the resistor 55 of the starting panel 56.

The starting panel 56 is of conventional construction and is arranged so that current from the battery at first is supplied to the dynamo D through the entire resistance of the resistor 55 to start the dynamo slowly as a motor. Later a portion of the resistance 55 is short-circuited to increase the speed of the dynamo as a motor and later all of the resistance 55 is short-circuited to operate the dynamo D as a motor at full speed.

The velocity switch 23 is of conventional construction and is arranged to actuate a member 92 which carries switch arms 93 and 94. The switch arm 93 is adapted to connect contacts 95 to close the circuit through leads 96 and 97 which are connected across the field resistor R of the dynamo to short-circuit the field resistor to convert the dynamo D from a motor to a generator. The switch arm 94 is adapted to connect contacts 98 to close the circuit through leads 47a, 91, relay 90, leads 89, 100, 99, 99a and 51 and battery 50.

The valve stem 26 of the by-pass valve 25 normally functions as the core or plunger of a solenoid, the coils of which are formed by the potential regulator coil P and the current regulator coil I to control the operation of the by-pass valve 25. Thus, the power generated by the dynamo D when operating as a generator automatically controls the by-pass valve 25 which in turn controls the fluid supplied by the hydraulic pump 15 to the hydraulic motor 22 thereby controlling the speed of the dynamo D. If, for any reason, the by-pass valve fails to be operated electrically as intended, the velocity switch 23 will cause an arm 101 to be actuated by the increased rate of flow of fluid through the conduit 21 and thereby cause the valve stem 26 to be actuated to effect a proper control of the by-pass valve 25.

If a railroad car which is represented by the axle 10 and wheels 11 is at rest and the car is too warm, the switch 61 is closed manually and the desired temperature is selected with the thermostat selector arm 64. This sets the fan 46 in operation by closing the circuit from the battery 50 through the motor 41. It also closes the circuit from the battery through the switch 61 and thence through the leads 65' and 65, thermostat T, lead 66 and thence through the relay 67 and leads 68 and 51 back to the battery 50. Thus, the relay 67 is energized to bring the switch arm 71 in engagement with the contact 72 thereby closing the circuit from the battery through the relay 74 to energize the latter. Energization of the relay 74 brings the switch arms 79 and 80 in engagement with the contacts 81 and 82, respectively. When the switch arm 80 engages the contact 82, the circuit is closed through the relay 90 to energize the latter and bring the switch arm 53 in engagement with the contact 52 to close the circuit from the battery through the starting panel 56 and the dynamo D.

Inasmuch as the switch arm 93 is out of engagement with the contacts 95, the dynamo D starts as a motor. Engagement of the switch arm 79 with contact 81 closes the circuit through the magnetic clutch M thereby connecting the dynamo D, which is now acting as a motor, with the compressor C to actuate the latter and supply refrigerant to the coil 39. If the car remains at rest this operation will continue until the car reaches the desired temperature at which time the thermostat will break the circuit through the relay 67 causing the latter to be de-energized and the switch arm 71 to open thereby breaking the connection from the battery to the dynamo. At the same time the circuit is broken through the magnetic clutch M to disconnect the dynamo and compressor.

If the railroad car is moving so that its speed gradually increases from below 20 miles per hour to a higher speed, the operation of the hydraulic pump is started by the action of the eccentrics 12 which supply power from the axle 10 through the eccentric rods 13 to the pistons 14. Fluid under pressure is now supplied from the hydraulic pump 15 to operate the hydraulic motor 22. As the speed of the car increases the speed of the hydraulic motor increases. If the car is too warm the compressor is being driven by the dynamo acting as a motor. When the speed of the hydraulic motor becomes slightly higher than the speed of the dynamo, the load of driving compressor C is transferred to the hydraulic motor due to the action of the overrunning clutch O. At this time the velocity of the fluid passing through the velocity switch 23 is such as to actuate the member 92 and move the switch arm 93 in engagement with the contacts 95. This action increases the generated E. M. F. of the dynamo and charges the battery 50. The hydraulic motor 22 now is driving both the dynamo D and the compressor C. While the hydraulic motor is driving the dynamo the by-pass valve 25 is controlled by the power generated by the dynamo so as to limit the amount of fluid supplied from the hydraulic pump 15 to the hydraulic motor thereby controlling the speed at which the hydraulic motor is driven and, consequently, the speed at which the dynamo and compressor are driven.

If the car now becomes cool enough while still running at a speed greater than twenty miles per hour, the thermostat T opens the circuit to the relay 67. This opens the switch arm 71 and de-energizes the relay 74 which in turn opens the switch arm 79 to open the circuit through the magnetic clutch M to break the driving connection between the hydraulic motor 22 and the compressor C. Since the switch arm 94 at this time is in engagement with the contacts 98, the circuit is closed from the battery through leads 47, 47a, 91, relay 90, leads 89, 100, 99, 99a and 51 back to the battery. The dynamo continues to act as a generator to charge the battery.

If while the car is still cool enough, it slows down to a speed less than twenty miles per hour, the speed of the hydraulic motor 22 will be reduced and the driving connection formed by the overrunning clutch between the hydraulic motor 22 and the shaft 28 will be disconnected. At the same time the velocity of fluid through the velocity switch 23 will be reduced so as to actuate the member 92 and move the switch arms 93 and 94 out of engagement with the contacts 95 and 98 respectively. This breaks the circuit through the relay 90 and contacts 98 to open switch arm 53 and break the circuit from the battery to the dynamo.

If the car is too warm while moving at a speed greater than twenty miles per hour, the hydraulic motor 22 will be driving both the compressor and the dynamo as a generator. If now the car slows down to a speed less than twenty miles per hour, the connection between the hydraulic motor 22 and the shaft 28 is broken through the overrunning clutch O. At the same time the velocity of the oil through the veloctiy switch 23 is such as to move the switch arm 93 out of engagement with the contacts 95 thereby increasing the speed of the dynamo which is now running as a motor which directly drives the compressor C through the magnetic clutch M. The thermostat T closes the circuit through the relay 67 which closes arm 71 to energize relay 74 to close arm 80 and energize relay 90 and close arm 53. This maintains the circuit from the battery to the dynamo while the circuit through contacts 98 is open.

If the compressor C is not operating while the car is running at a speed greater than twenty miles per hour and the car requires cooling, the switch of the thermostat T will close thereby closing the circuit through the relay 67 which in turn will move the switch arm 71 to close the circuit through the relay 74 which moves the switch arms 79 and 80 into engagement with the contacts 81 and 82, respectively. The circuit then is closed through the lead 33 and magnetic clutch M, thereby effecting a driving connection between the hydraulic motor and the compressor C. The hydraulic motor 22 now will drive both the compressor and the dynamo as a generator.

The pressure switch is a safety device which is operative to break the electrical circuit through the magnetic clutch if the pressure developed by the compressor C is too low or too high and thus mechanically disconnect the compressor from the hydraulic motor and dynamo.

The hydraulic pump 15 may be mounted upon the truck frame of the car in such a manner that it could be easily repaired or replaced. The eccentrics or cams 12 may be formed of two pieces which may be easily mounted upon or removed from the axle 10. The assembly including the dynamo D, compressor C, magnetic clutch M and hydraulic motor 22 may be located under the outside edge of the car and easily accessible for removal or repair. The controls, both mechanical and electrical are simple and may be tested or repaired by an ordinary repairman and would not require the services of an expert. The equipment as a whole is about fifty per cent lighter than that heretofore in general use. Its efficiency is higher due in large part to the fact that the controls function to take from the axle only that amount of power which is to be used instead of taking a surplus and wasting it in heat.

Other adaptations of the invention, such for example as car lighting, will be readily apparent to those skilled in the art.

I claim:

1. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, and means responsive to a predetermined velocity of the fluid in said conduit for causing said dynamo to change its action from that of a motor to that of a generator.

2. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, and means responsive to a predetermined velocity of the fluid in said conduit for causing said dynamo to change its action from that of a motor to that of a generator, and responsive to a predetermined lower velocity to disconnect the dynamo and battery.

3. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, and means responsive to a predetermined velocity of the fluid in said conduit for causing said dynamo to change its action from that of a motor to that of a generator, and means for controlling the quantity of fluid supplied to said hydraulic motor for operating said dynamo.

4. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, means responsive to a predetermined velocity of the fluid in said conduit for causing said dynamo to change its action from that of a motor to that of a generator, means responsive to the electrical energy generated by said dynamo for limiting the speed of said dynamo when functioning as a generator.

5. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, means responsive to a predetermined velocity of the fluid in said conduit for causing said dynamo to change its action from that of a motor to that of a generator, and means responsive to the electrical energy generated by said dynamo for controlling the quantity of fluid supplied to said hydraulic motor for operating said dynamo.

6. In combination, a vehicle, an hydraulic pump adapted to be actuated by a moving part of the vehicle, an hydraulic motor, a fluid conduit connecting said pump and motor, a dynamo, releasable means for connecting said dynamo and hydraulic motor, a battery, electrical connections between said battery and dynamo, means responsive to a predetermined velocity of the fluid in said conduit for causing said dynamo to change its action from that of a motor to that of a generator, and responsive to a predetermined lower veloctly to disconnect the dynamo and battery, and means responsive to the electrical energy generated by said dynamo for controlling the quantity of fluid supplied to said hydraulic motor for operating said dynamo.

7. In combination, a vehicle; a torque-producing device operative in response to the movement of the vehicle; a motor-generator unit; a load; a first and second releasable driving connection between said unit and load and between said unit and device; a battery; control means to cause said unit to act as a motor energized from said battery; means responsive to a predetermined rate of operation of said device to cause said unit to cease acting as a motor and to act as a generator to charge said battery; and means responsive to a predetermined current generated by said unit for causing uniform operation of said device at which said current is generated regardless of increasing speed of the vehicle.

8. In combination, a vehicle; a torque-producing device operated in response to the movement of the vehicle; a motor-generator unit; an overrunning clutch for drivingly connecting said unit and device; a battery; a load; another clutch for drivingly connecting said unit with said load; control means to cause said unit to act as a motor energized by said battery; and means to cause said unit to act as a generator to charge said battery.

9. In combination, a vehicle; a torque-producing device operated in response to the movement of the vehicle; a motor-generator unit; an overrunning clutch for drivingly connecting said unit and device when the latter is the driver; a battery; a load; another clutch for drivingly connecting said unit with said load; control means to cause said unit to act as a motor energized by said battery; and means responsive to a predetermined rate of operation of said device for causing said unit to act as a generator to charge said battery.

10. In combination, a vehicle; a torque-producing device operated in response to the movement of the vehicle; a motor-generator unit; an overrunning clutch for drivingly connecting said unit and device when the latter is the driver; a battery; a load; another clutch for drivingly connecting said unit with said load; control means to cause said unit to act as a motor energized by said battery; means responsive to a predetermined rate of operation of said device for causing said unit to act as a generator to charge said battery; and means responsive to a predetermined current generated by said unit for controlling the rate of operation of said device independently of any increasing speed of the vehicle.

WILLIAM R. BALLOU, Jr.